US005640895A

United States Patent [19]
Anetsberger

[11] Patent Number: 5,640,895
[45] Date of Patent: Jun. 24, 1997

[54] CHAR-BROILING GRILL WITH VERTICALLY ADJUSTABLE GRILL PLATES

[75] Inventor: Richard J. Anetsberger, Northbrook, Ill.

[73] Assignee: Anetsberger Brothers, Inc., Northbrook, Ill.

[21] Appl. No.: 528,770

[22] Filed: Sep. 15, 1995

[51] Int. Cl.[6] .................. A47J 27/62; A47J 37/06
[52] U.S. Cl. .................. 99/349; 99/343; 99/374; 99/379
[58] Field of Search .................. 99/326–331, 335, 99/342–349, 375–379, 390, 391, 383, 423–426; 219/524, 525, 443; 100/93 P, 233; 126/39 H, 41 R

[56] References Cited

U.S. PATENT DOCUMENTS

| 4,601,237 | 7/1986 | Harter et al. | 99/379 |
| 4,700,619 | 10/1987 | Scanlon | 99/349 |
| 4,878,424 | 11/1989 | Adamson | 99/331 |
| 4,913,040 | 4/1990 | Sherman et al. | 99/372 |
| 4,972,766 | 11/1990 | Anetsberger | 99/388 |
| 5,341,727 | 8/1994 | Dickson | 100/93 P |

*Primary Examiner*—Timothy F. Simone
*Attorney, Agent, or Firm*—McCaleb, Lucas & Brugman

[57] ABSTRACT

A cooking grill apparatus having superposed, vertically separable, heated grill plates, the uppermost one of which is pivotally connected to the outer ends of two laterally spaced arms which pivot simultaneously about an elevated horizontal pivot axis whereby the upper grill is moveable about such pivot axis with and selectively relative to such spaced arms. The upper grill carries a pair of like parallelogram linkage systems along its lateral margins which include adjustable stop means for engaging parallel stationary reference surfaces paralleling the plane of the cooking surface for the stationary lower grill plate. Selected movement of the parallelogram linkage system to change the vertical position of the stop means is determined by selectively operable gauge means for limiting movement of the linkage systems and thus movement of the stop means towards the references surfaces whereby the spacing between the two grill plates during cooking operation is correspondingly selectively limited.

8 Claims, 5 Drawing Sheets

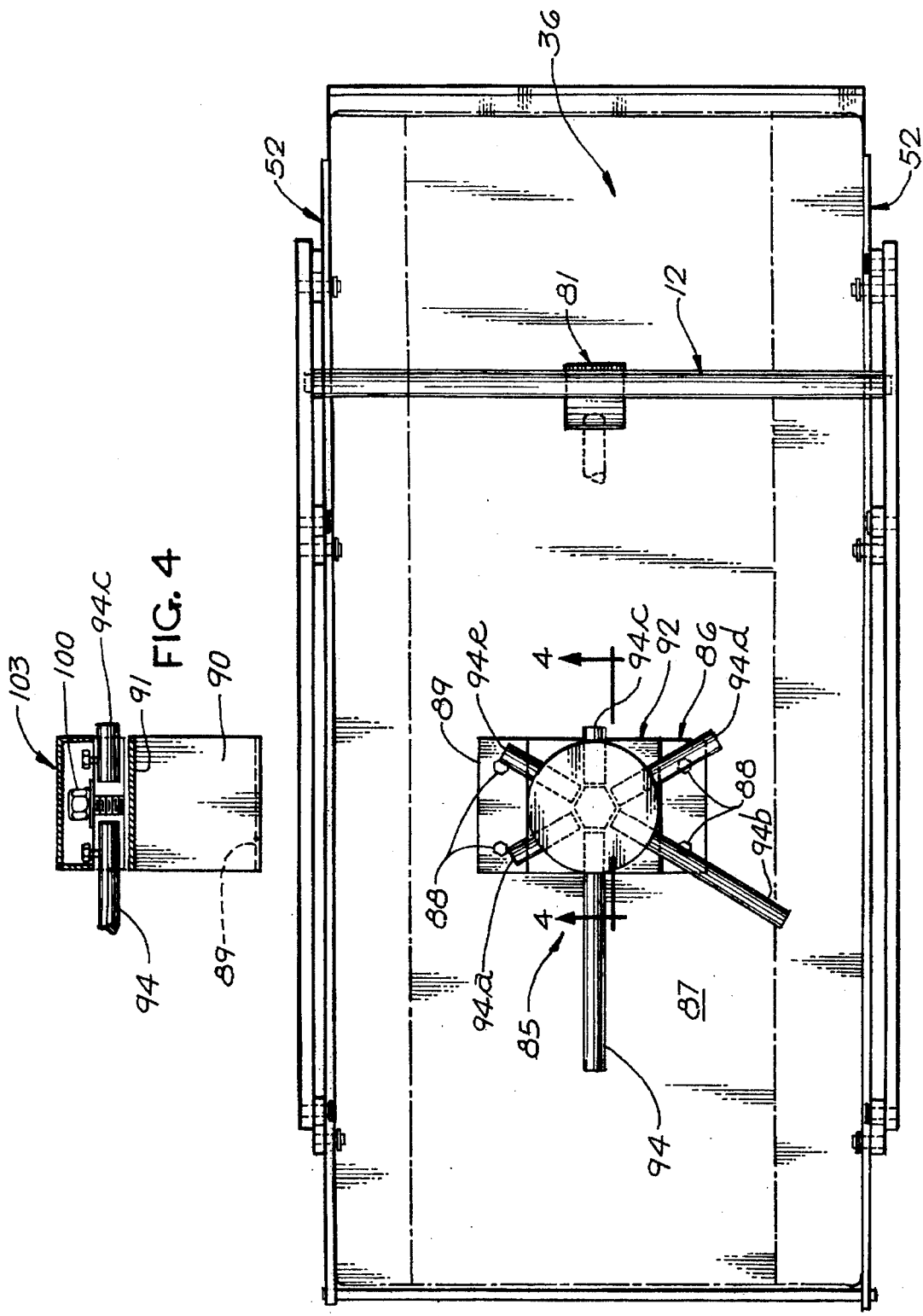

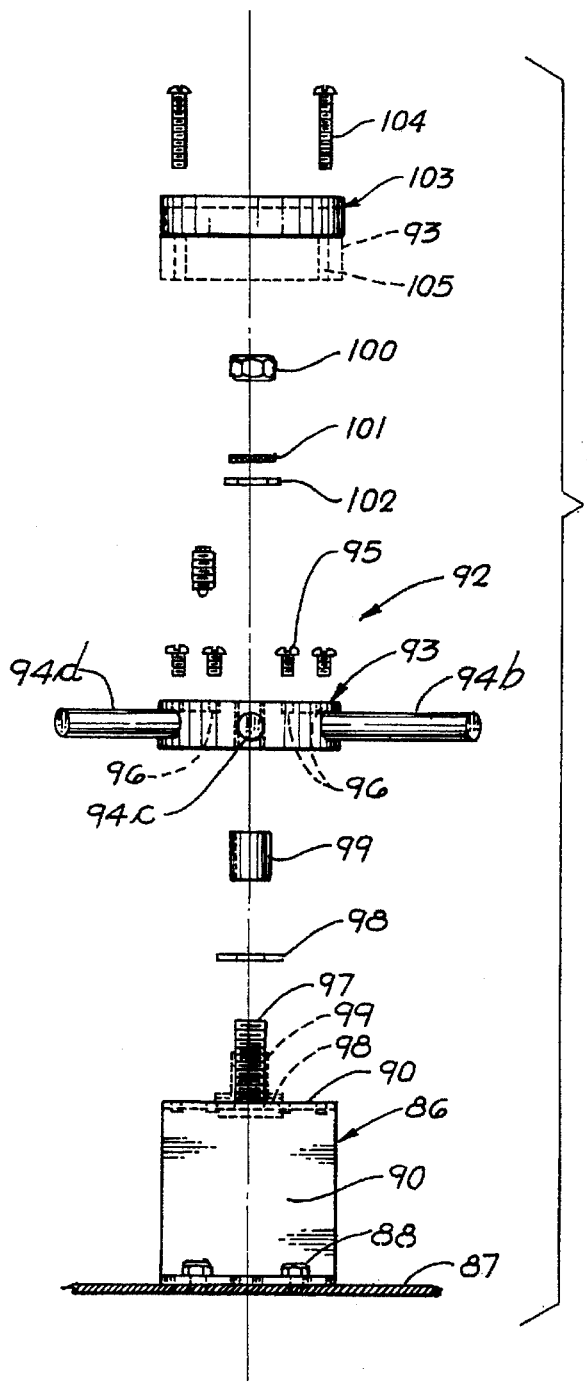
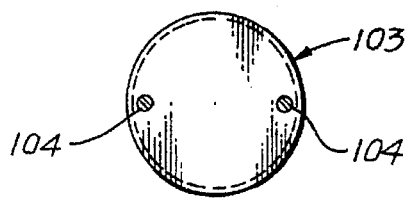
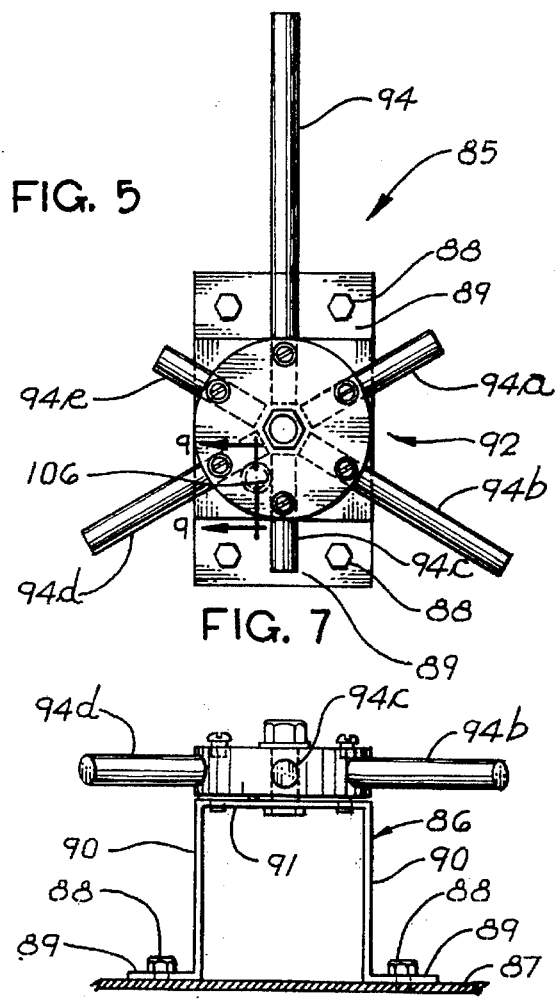
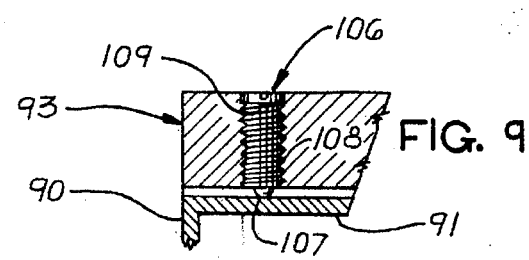

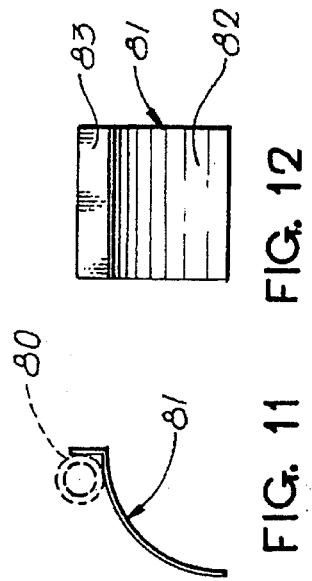
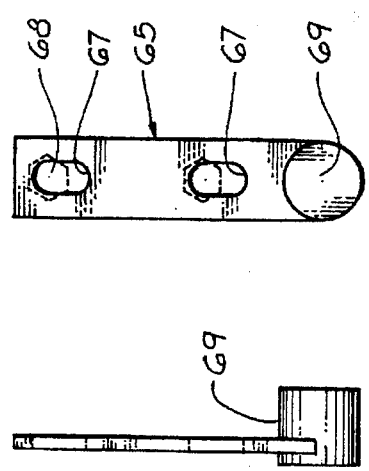
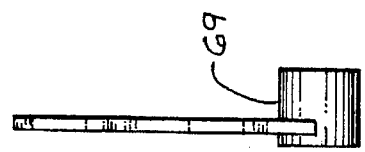
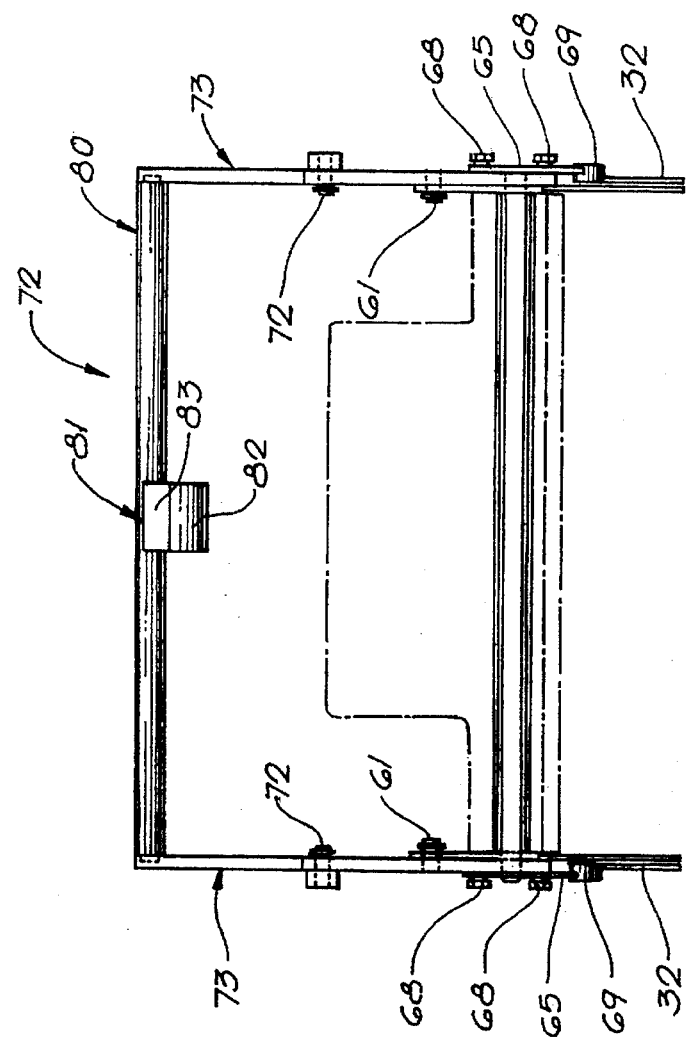
FIG. 11  FIG. 12  FIG. 14  FIG. 13  FIG. 10

CHAR-BROILING GRILL WITH VERTICALLY ADJUSTABLE GRILL PLATES

This invention relates in general to cooking apparatus and more particularly to dual platen grills for broiling meats, poultry, fish and similar products of varying thickness.

It is a particular object of this invention to provide a cooking grill having superposed heating or cooking platens for simultaneously effecting two sided cooking of raw food wherein the vertical spacing between the cooking platens is selectively adjustable to accommodate foods of different thicknesses for the purpose of promoting uniformity of cooked product.

Another important object of this invention is to provide an improved double platen cooking grill in which superposed cooking platens are positively positioned in parallel pre-selected spaced positions throughout a cooking cycle so that the food placed therebetween is generally uniformly engaged and cooked within a given time period.

Having described this invention, the above and further objects, features and advantages thereof will be recognized from the following description of a preferred embodiment of the invention, illustrated in the accompanying drawings and representing the best mode presently contemplated for enabling those skilled in the art to practice this invention.

IN THE DRAWINGS

FIG. 3 is a top plan view of the assembly shown in FIG. 2;

FIG. 4 is a side elevational view with portions broken away in section taken substantially along vantage line 4—4 of FIG. 3 and looking in the direction of the arrows thereon;

FIG. 5 is an exploded front elevational view of gauge means employed with the cooking platens shown in FIGS. 2 and 3;

FIG. 6 is a top plan view of a turn style cover shown in FIG. 5;

FIG. 7 is a top plan view of the assemble turn style and mounting support shown in FIG. 5;

FIG. 8 is a side elevational view of the assembled gauge means and mounting support shown in FIG. 7;

FIG. 9 is an enlarged partial sectional view taken substantially along vantage line 9—9 of FIG. 7, looking in the direction of the arrows thereon;

FIG. 10 is a front elevational view of a handle assembly and associated platen spacing means shown in FIG. 1;

FIG. 11 is an end elevational view of a bumper employed in the handle assembly shown in FIG. 10;

FIG. 12 is a front elevational view of the bumper shown in FIG. 11;

FIG. 13 is a side elevational view of an adjustable link employed in the spacing means shown in FIG. 10; and FIG. 14 is a front elevational view of the link shown in FIG. 13.

DESCRIPTION OF THE PREFERRED EMBODIMENT

It is to be noted that while the present invention is applicable to various conventional cooking grills having superposed grill plates or platens, the particular cooking apparatus illustrated and described hereinafter is generally in accordance with the teachings set out in my U.S. Pat. No. 4,972,766, issued Nov. 27, 1990, modified to incorporate the improved combination of this invention.

Figure 1:
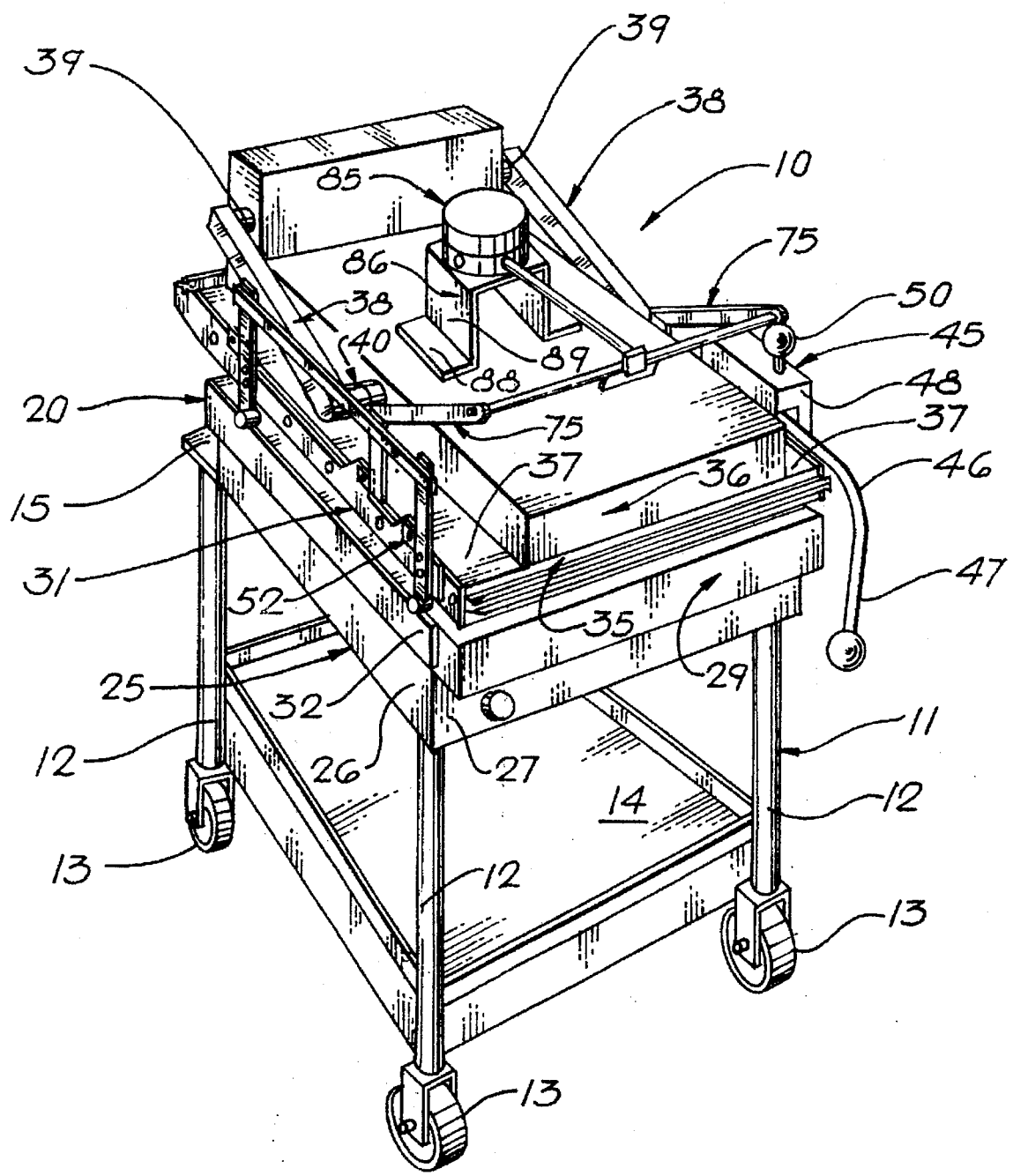
FIG. 1 is a perspective view of an improved double platen cooking apparatus according to this invention.

With initial reference to FIG. 1 of the drawings, the improved cooking apparatus indicated generally at 10 thereat includes a suitable support, such as a countertop, cabinet or as illustrated, a wheeled cart 11 of known structure. Cart 11 comprises four upright legs 12, each having a ground engaging caster 13 at its lower end. A planar shelf 14 conveniently cross connects the legs 12 adjacent their lower ends and horizontal frame members 15 interconnect the legs adjacent their upper ends to provide a stable undersupport for grill assembly 20 embodying this invention.

As shown grill assembly 20 includes a rectangular shaped housing 25 secured across the upper end of the cart 11 and comprising two parallel side walls 26 and a transverse front wall 27 paralleled by a rear wall panel (not shown) all welded to a suitable interior framework (not shown). A grease trough 29 is conventionally detachably mounted across the front wall 27 to catch grease and drippings from the grill assembly 20 according to known practice.

Figure 2:
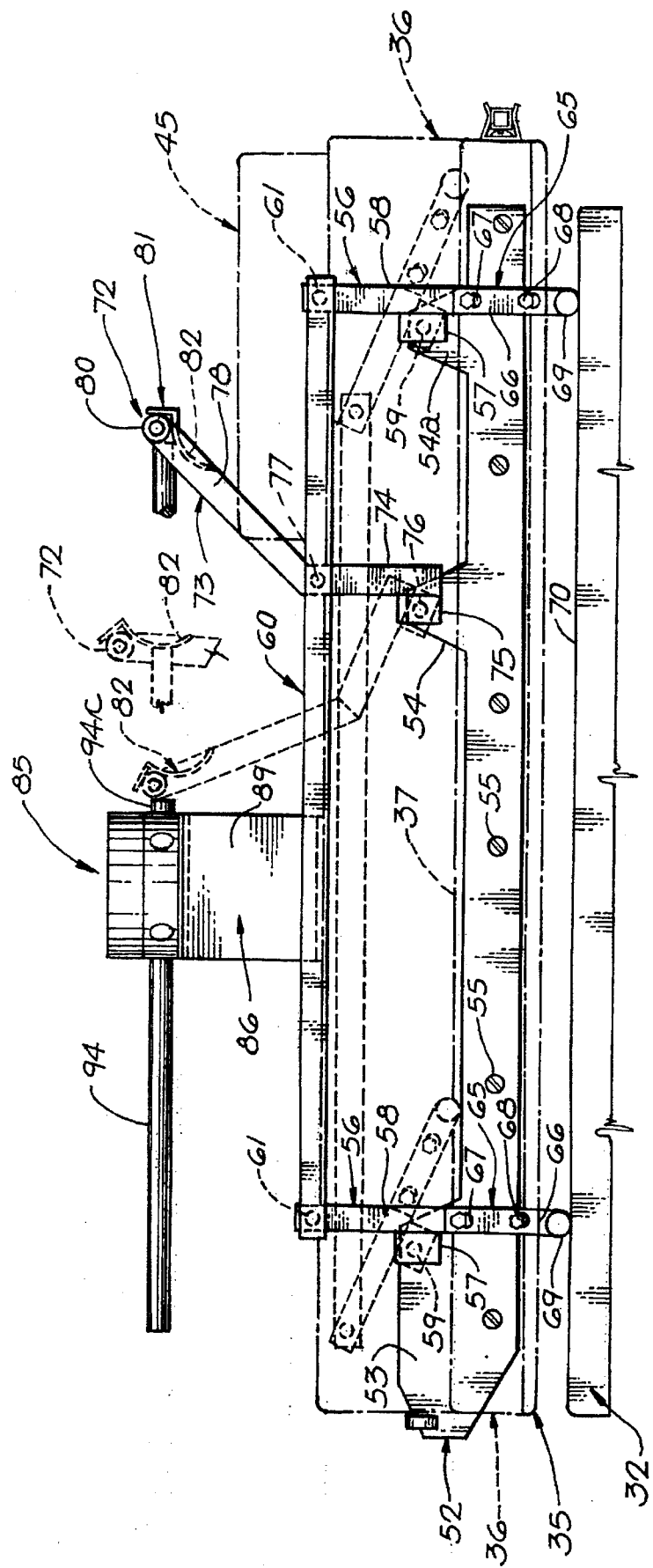
FIG. 2 is an enlarged partial right hand side elevational view of the assembled cooking platens and spacing means according to this invention.

The grill assembly 20 as shown in FIGS. 1 and 2 includes a generally planar, rectangular metal bottom grill plate or platen 31 mounted over the upper side of housing 25. This platen is bordered on three sides by metal splash guards 32 unified with the platen and operable to assist in deterring hot grease and cooking juices from splattering outwardly during cooking operations. Platen 31 is heated by conventional electric resistance heating rods or by gas fired burners in a known fashion.

Assembly 20 is also provided with an upper planar grill plate or platen 35 as seen in FIGS. 1 and 2, which superposes the lower grill plate and closes over the bottom side of an upper housing 36 containing conventional electric resistance heating elements or gas burners like the bottom grill plate. As best seen in FIG. 1, housing 36 is a generally rectangular parallelolpiped with longitudinally extending recessed areas 37, 37 extending along opposite lateral margins thereof. Two parallel yoke arms 38, 38 extend angularly between and are connected at one end to a tubular rear pivot shaft 39 elevated above one end of housing 36 and a pair of tubular trunnion shafts 40, 40 protruding laterally outwardly of opposite sides of housing 36, at substantially the mid-point of the upper grill plate. With this arrangement the upper grill plate is mounted for pivotal movement with the yoke arms 38 about the axis of shaft 39 as well as relative to arms 38 about the trunnion support shafts 40, 40.

To enable the upper grill to move with arms 38 or relative thereto about trunnions 40, 40, a locking mechanism 45 comprising an elongated operating rod 46 equipped with a down turned handle portion 47 at its outer end is provided. Rod 46 is mounted to linearally reciprocate within housing 48 that it's inner end may be selectively engaged and disengaged with spaced keeper means (not shown) projecting from the right hand arm 38, as seen in FIG. 1. When the inner end of the one arm 38 is engaged by the keeper means the upper grill plate is locked with the arms 38 to move therewith about shaft 39. Conversely, when rod 46 is withdrawn from the keeper means the grill plate 37 is free to move with the arms 38 about the axis of shaft 39 and also to pivot relative to arms 38 about the trunnion shafts 40.

In order to maintain rod 46 in a selected position, either latched with the keeper means or disengaged therefrom, spring loaded release pin means 50 are provided to engage space detents in the handle rod 46 whereby the latter can be held in positions for either engaging or disengaging the keeper means as desired.

While not illustrated herein, a suitable counter weight system preferably is employed to assist in regulating the pivotal movements of the upper grill plate, as described more fully in my aforenoted U.S. Pat. No. 4,972,766.

Having described the context of a preferred two platen cooking grill with which this invention is useful, the features of means for conveniently adjusting the spacing between the cooking platens or grill plates according to this invention will now be set forth.

As best shown in FIGS. 1–3, the upper grill plate or platen 35 is laterally bordered by two parallel, elongated, heavy metal side plates 52, 52 extending along the longitudinal edges of housing 36. Such plates are generally rectangular and each includes one elongated end mounting lobe 53 and two smaller identical intermediate lobes 54, 54a projecting upwardly in spaced relation along the upper margins of plates 52. A plurality of spaced screw fastener 55 or the like serve to fix plates 52 in place so that the lower edges thereof parallel the plane of the upper grill 35 (see FIG. 2).

Each of the side plates 52 supports a pair of identical pivot links 56 at its opposite ends, each of which links comprises a central pivot connector portion 57 projecting laterally outwardly to one side of a linear body portion 58 thereof. Support portion 57 of each link 56 is pivotally joined by a connector 59 to one of the two mounting lobes 53 and 54a located near opposite ends of an associated side plate 52 with the links 56 positioned on the laterally outer side of the side plates 52 in assembly.

An elongated linear link bar 60 extends between the upper ends of the two pivot links 56 and is pivotally joined thereto by connectors 61 to form two parallelogram systems for maintaining links 56 in constant parallelism throughout the full range of movement thereof.

Mounted on the lower end of each of the links 56 is a linear adjustment link 65 comprising a linear body 66 having a pair of axially spaced adjustment slots 67 therethrough for reception and passage of adjustment screws 68 that engage with appropriate threaded openings in the respective links 56. The adjustment links extend beyond the lower ends of the pivot links and incorporate cylindrical stop buttons 69 fixed at their outer ends to project to one side thereof so as to interferingly engage with upper edges 70 of the underlying splash guards 32; such edges 70 constituting reference planes paralleling the upper cooking face of the lower grill plate 31 for reasons that will appear hereinafter.

Adjustment of the links 65 relative to the pivot links is usually set at the factory whereby to establish maximum and minimum cooking elevations of the upper grill plate relative to the lower grill plate as indicated respectively in the full and dotted line positions of the adjustment lines in FIG. 2.

In order to activate the two parallelogram linkage systems on opposite sides of the upper grill plate 35 simultaneously, an operating handle assembly 72 interjoins the two parallelogram systems and comprises a pair of parallel, planar handle arms 73, 73 one associated with each of the side plates 52 (see FIGS. 1–3).

As shown, each handle arm 73 has a planar linear lower arm portion 74 with an integral co-planar mounting ear portion 75 extending laterally outwardly of one side thereof. Pivot pin connectors 76 join ear portions 75 to the intermediate or middle mounting lobe portions 54 associated with the two side plates 52 (see FIG. 2).

Adjacent the upper end of the lower arm portion 75 of each handle arm 73 is a second pivot connector 77 which serves to pivotally interjoin such arm portion to a bar 60 so that the arm portion 74 parallels the two links 58 and is moveable simultaneously therewith. Extending at an angle from the upper end of each of the lower arm portion 74 is an integral upper arm portion 78. The two handle arms so provided are located on opposite sides of the upper grill plate and have their upper arm portions 78 interconnected by a cylindrical handle rod 80, having its ends welded to or otherwise rigidly fixed to the outer ends of arm portions 78.

Mounted substantially at the midportion of rod 80 is a metal bumper 81 formed with a concave-convex bumper portion 82 depending from a planar rectangular mounting portion 83 thereof. The bumper 81 operates to properly locate the handle rod 80 at certain selected positions corresponding to desired spacing between the two grill plates or platens as will appear presently. To insure consistency, cooperating space measuring means 85 are provided comprising a generally U-shaped metal bracket 86 mounted in inverted position generally centrally of the top wall 87 of the upper grill plate housing 36 (see FIGS. 1–3). Machine screw fasteners 88 secure out-turned planar feet 89, located at the lower ends of parallel bracket legs 90, to the upper wall of the housing 36. Bracket 86 presents a planar base or platform 91 extending integrally between the upper ends of the bracket legs 90 for the purpose of undersupporting a turn style assembly 92, as best illustrated in FIGS. 5–9.

As shown in FIG. 5, in particular, the turnstyle assembly 92 comprises a cylindrical turn style member 93 having a plurality (six as shown) cylindrical gauge rods 94, 941, 94b, 94c, 94d and 94e extending radially outwardly therefrom. These rods are of various lengths and are held in desired axial positions of adjustment in respective radial sockets of member 93 by lock screws 95 threaded into bores 96 in the turnstyle member 93. Screws 95 engage respective gauge rods internally of member 93 and hold the same in desired adjusted axial positions in their respective sockets.

A central threaded mounting posts 97 extends upwardly through a central opening in bracket platform 91 for rotatably receiving the turn style member 93 thereon. A plain washer 98 fits over post 97 to engage the upper face of platform 91 and the underside of the turn style member 93 while a cylindrical sleeve bearing 99 fits closely about post 97 coaxially within a central axial bore (unnumbered) in member 93 to insure smooth rotational movement of the turn style member about post 97. A nut 100, lock washer 101 and plain washer 102 fit over the upper end of the post 97 to axially secure the turnstyle member in operating position. A cylindrical cover member 103 is secured over the upper end of member 93 by a pair of threaded bolts 104 which thread into bores 105 formed for that purpose in the turnstyle member 93 as shown in FIG. 5.

Detent means 106 comprising a spring loaded ball 107 and an adjusting screw 108 thread into bore 109 extending through the member 93 to cooperate with arcuately spaced depressions (not shown) formed in the upper face of the bracket platform 91 whereby to arrest each of the gauge rods in an operational indexed position for engagement by the handle assembly 72.

It will be understood and recognized from FIG. 2, in particular, that when the handle rod engages the outer end of the longest gauge rod 94c the spacing between the two grill plates is resultantly at a maximum. Conversely, engagement between rod 80 and the shortest gauge rod 94c results in a minimum spacing between the grill plates. The intermediate length rods 94a, b, d and e, of course, produce selected grill spacings intermediate the maximum and minimum as above described. Inasmuch as the rod 80 moves along an arc it will be recognized that bumper 81 engages the ends of the intermediate length gauge rods as indicated by the dotted line position of the handle assembly in FIG. 2. It will be recognized that the parallelogram linkage system serves to engage all the stop-button 69 simultaneously with the upper edges of the splash guard plates 32 to maintained the grill plates parallel during the cooking cycle regardless of the selected spacing thereof. Thus, that desirable objective of this invention is achieved by manually indexing of the turnstyle to bring selected gauge rods into play permitting easy and convenient parallel spacing of the grill plates to cook products of various thickness so as to insure substantial uniform cooking thereof between the superposed cooking platens.

From the foregoing, it is believed that those skilled in the art will readily recognize and appreciate the novel advancement of this invention over the prior art and readily will understand that while the same is herein been described in association with a particular preferred embodiment thereof illustrated in the accompanying drawings, the same is obviously susceptible to variation, modification and substitution of equivalents without departing from the spirit and teachings of the invention which are intended to be unlimited by the foregoing except as may appear in the following appended claims.

The embodiments of the invention in which an exclusive property or privilege is claimed are defined as follows:

1. A cooking grill assembly for two sided broiling of meat, fish and poultry food products of various thicknesses comprising:

a first heated planar grill plate stationarily mounted in a horizontal position, a second heated planar grill plate pivotally mounted for vertical movements toward and away from said first grill plate;

manually operable means for positioning and maintaining said second grill plate as preselected cooking positions paralleling said first grill plate whereat the resultant spacing between the two grill plates insures substantially uniform cooking of food products having substantially the same thickness;

said means for positioning and maintaining said second grill plate comprising a parallelogram linkage system connected to said second grill plate and operable to locate associated stop members simultaneously in selected planes of reference paralleling said first grill plate whereby to limit movement of said second grill plate towards said first grill plate while maintaining the two grill plates parallel.

2. The cooking grill assembly of claim 1, wherein said stop members are adjustably mounted on said linkage system.

3. The grill assembly of claim 1 wherein the linkage system comprises plural parallel links pivotally secured to and arranged to pivot along opposite lateral margins of said second grill plate, and plural stop members operably positioned by predetermined movement of said links for correspondingly limiting the spacing between said two grill plates while maintaining the same parallel.

4. The grill assembly of claim 3, and manually operable means interconnecting said links whereby the same are simultaneously operable to position said stop members.

5. The grill assembly of claim 4, and means engaging said manually operable means for limiting movement of said links and the positioning of said stop members.

6. The grill assembly of claim 1, and gauge means selectively operable to limit operation of said means for positioning said second grill plate at plural selected limits whereby to selectively determine the spacing between the two grill plates in accordance with the thickness of the food product.

7. The grill assembly of claim 6, wherein said gauge means is manually operable to provide a plurality of stop limits to said means for positioning said second grill plate.

8. The grill assembly of claim 6, wherein said gauge means comprises a rotatably mounted turnstyle carrying a plurality of radially extending linear gauge rods of differing lengths; each said rod being selectively positioned to interferingly engage with said means for positioning said second grill plate whereby to selectively determine the cooking position for said second grill plate.

* * * * *

UNITED STATES PATENT AND TRADEMARK OFFICE
CERTIFICATE OF CORRECTION

PATENT NO. : 5,640,895
DATED : 6/24/97
INVENTOR(S) : Richard J. Anetsberger

It is certified that error appears in the above-identified patent and that said Letters Patent is hereby corrected as shown below:

Col. 4, line 62, delete "94c" and insert -- 94 --.

Signed and Sealed this

Twenty-eighth Day of October, 1997

Attest:

BRUCE LEHMAN

Attesting Officer

Commissioner of Patents and Trademarks